United States Patent
Sugino

(10) Patent No.: US 8,516,192 B2
(45) Date of Patent: Aug. 20, 2013

(54) CONTROL UNIT, IMAGE PROCESSING APPARATUS AND COMPUTER-READABLE STORAGE MEDIUM

(75) Inventor: Makoto Sugino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 924 days.

(21) Appl. No.: 12/359,380

(22) Filed: Jan. 26, 2009

(65) Prior Publication Data

US 2009/0193181 A1  Jul. 30, 2009

(30) Foreign Application Priority Data

Jan. 28, 2008  (JP) ................................. 2008-015845

(51) Int. Cl.
  *G06F 12/02*  (2006.01)
(52) U.S. Cl.
  USPC .... 711/115; 711/154; 711/170; 711/E12.001; 714/38.11
(58) Field of Classification Search
  USPC ......................................................... 711/115
  See application file for complete search history.

(56) References Cited

U.S. PATENT DOCUMENTS

| | | | | |
|---|---|---|---|---|
| 5,218,406 A | * | 6/1993 | Ebner | 399/11 |
| 7,478,248 B2 | * | 1/2009 | Ziv et al. | 713/193 |
| 2004/0103288 A1 | * | 5/2004 | Ziv et al. | 713/185 |
| 2006/0001904 A1 | | 1/2006 | Takara | |
| 2009/0172409 A1 | * | 7/2009 | Bullis et al. | 713/189 |
| 2010/0153785 A1 | * | 6/2010 | Keromytis et al. | 714/38 |

FOREIGN PATENT DOCUMENTS

| | | |
|---|---|---|
| JP | 08-328912 | 12/1996 |
| JP | 2001-109648 | 4/2001 |
| JP | 2002-015008 | 1/2002 |
| JP | 2006-004246 | 1/2006 |
| JP | 2006-018660 | 1/2006 |
| JP | 2007-172414 | 7/2007 |
| JP | 2007-334403 | 12/2007 |

* cited by examiner

Primary Examiner — Michael Krofcheck
(74) Attorney, Agent, or Firm — IPUSA, PLLC

(57) ABSTRACT

A memory information storage control method is executed by a control unit which carries out a memory information storage process to generate memory information related to a program being executed by the control unit and to store the memory information. The memory information storage control method includes an interface process to register a storage location of the memory information generated by the memory information storage process, a registering process to register a portable storage device as the storage location of the memory information using the interface process, and an executing process to confirm coupling of the portable storage device to the control unit and to register the storage location of the memory information in the detachably coupled portable storage device by the registering process.

20 Claims, 11 Drawing Sheets

CONTROL UNIT, IMAGE PROCESSING APPARATUS AND COMPUTER-READABLE STORAGE MEDIUM

BACKGROUND OF THE INVENTION

1. Field of the Invention

The present invention generally relates to control units, image processing apparatuses and computer-readable storage media, and more particularly to a control unit, an image processing apparatus and a computer-readable storage medium which stores a program for storing memory information in a portable storage device. The present invention also relates to a memory information storage control method for controlling storage of the memory information in the portable storage device.

2. Description of the Related Art

Conventionally, in a control unit which executes an application program on a general-purpose Operating System (OS) such as UNIX (registered trademark), there is a function of forcibly ending the application program from the OS when the operation of the application program cannot be continued in a normal manner. For example, in the general-purpose OS typified by UNIX, if the operation of the application program cannot be continued in the normal manner, a signal is sent to the application program to end the processes of the application program, and a core dump process is executed depending on the type of the signal sent from the OS to the application program.

Recently, in image processing apparatuses, such as printing apparatuses, facsimile apparatuses, copying apparatuses and Multi-Function Peripheral (MFPs), which are embedded in advance with predetermined functions, an OS based on the general-purpose UNIX OS is employed because of the demand to provide numerous functions in order to improve the performance of the image processing apparatuses. Hence, in such image processing apparatuses, a core dump process is executed if an abnormality is generated.

Conventionally, the OS executes the core dump process in a manner shown in FIG. 1. FIG. 1 is a flow chart for explaining an example of a conventional memory information storage process. If an abnormality which requires execution of the core dump process is generated, the OS calls a core dump executing part, and the core dump executing part creates a name of a core file in a step S1001 shown in FIG. 13. The core file name is created using the name, process ID or the like of an application program which generated the abnormality. Next, the core dump executing part decides whether the file with the core file name can be created in a work directory of the application program which is the core dump target, in a step S1002. The core dump process ends if the file with the core file name cannot be created in the work directory and the decision result in the step S1002 is NO.

If the file with the core file name can be created in the work directory and the decision result in the step S1002 is YES, the core dump executing part creates the file with the core file name in a step S1003. In addition, the core dump executing part writes memory information used by the application program in the file with a size of the memory block managed by the OS, in a step S1004.

When the memory information is written to the file, the core dump executing part decides whether the memory information is written in a normal manner, in a step S1005. The core dump process ends if the memory information is not written in the normal manner and the decision result in the step S1005 is NO.

If the memory information is written in the normal manner and the decision result in the step S1005 is YES, the core dump executing part decides whether the memory information that is written is the last block within the memory which is being used by the application program, in a step S1006. If the memory information that is written is not the last block within the memory which is being used by the application program and the decision result in the step S1006 is NO, the process returns to the step S1004, and the steps S1004 through S1006 are carried out similarly as described above.

On the other hand, the core dump executing part ends the core dump process if the memory information that is written is the last block within the memory which is being used by the application program and the decision result in the step S1006 is YES.

The core dump process described above writes the memory information to a storage unit having a large storage capacity, such as a hard disk drive. However, compact and inexpensive apparatuses, such as embedded apparatuses, are in most cases not provided with the storage unit having the large storage capacity, such as the hard disk drive, in order to reduce the cost of the apparatus. In such apparatuses not provided with the storage unit having the large storage capacity, it is difficult to utilize the core dump function.

A Japanese Laid-Open Patent Application No. 2007-172414 proposes a technique for generating a core file suited to a preset storage size, prior to executing the core dump process.

In addition, a Japanese Laid-Open Patent Application No. 8-328912 proposes a technique for outputting a core file via a network to a remote hard disk drive.

However, according to the techniques proposed in the Japanese Laid-Open Patent Applications No. 2007-172414 and No. 8-328912, it is difficult to positively execute the core dump process at a low cost.

First, according to the technique proposed in the Japanese Laid-Open Patent Application No. 2007-172414, the core file is generated by limiting the storage size. For this reason, the core file that can be stored is limited, and if it becomes necessary to interpret the information that is not stored as the core file, the information must be acquired again, thereby making both the processing efficiency and utilization efficiency of the technique poor.

Second, according to the technique proposed in the Japanese Laid-Open Patent Application No. 8-328912, the core file is output to the remote storage unit via the network. For this reason, the core file cannot be stored if an apparatus for transmitting the core file is not connected to the network or, the apparatus for transmitting the core file is connected to the network but the remote storage unit for storing the core file cannot be provided.

SUMMARY OF THE INVENTION

Accordingly, it is a general object of the present invention to provide a novel and useful control unit, image processing apparatus, memory information storage control method and computer-readable storage medium, in which the problems described above are suppressed.

Another and more specific object of the present invention is to provide a control unit, an image processing apparatus, a memory information storage control method and a computer-readable storage medium capable of positively storing memory information related to a program which is being executed, at a low cost.

According to one aspect of the present invention, there is provided a control unit comprising a memory configured to store a program; a processing unit configured to execute the program stored in the memory; a memory information storage part configured to carry out a memory information storage process which generates memory information related to the program being executed by the processing unit and stores the memory information; an interface part configured to register a storage location of the memory information generated by the memory information storage part; a registering part configured to register a portable storage device as the storage location of the memory information using the interface part; and an executing part configured to confirm coupling of the portable storage device to the control unit and to register the storage location of the memory information in the detachably coupled portable storage device by the registering part.

According to another aspect of the present invention, there is provided an image processing apparatus comprising an engine configured to carry out an image process; and a control unit coupled to the engine, said control unit comprising a memory configured to store a program; a processing unit configured to execute the program stored in the memory; a memory information storage part configured to carry out a memory information storage process which generates memory information related to the program being executed by the processing unit and stores the memory information; an interface part configured to register a storage location of the memory information generated by the memory information storage part; a registering part configured to register a portable storage device as the storage location of the memory information using the interface part; and an executing part configured to confirm coupling of the portable storage device to the image processing apparatus and to register the storage location of the memory information in the detachably coupled portable storage device by the registering part.

According to a further aspect of the present invention, there is provided a computer-readable storage medium on which a computer-readable program for causing a computer to control storage of memory information is stored, said program comprising a memory information storage procedure causing the computer to carry out a memory information storage process which generates memory information related to a program being executed by the computer and stores the memory information; an interface procedure causing the computer to register a storage location of the memory information generated by the memory information storage procedure; a registering procedure causing the computer to register a portable storage device as the storage location of the memory information using the interface procedure; and an executing procedure causing the computer to confirm coupling of the portable storage device to the computer and to register the storage location of the memory information in the detachably coupled portable storage device by the registering procedure.

According to another aspect of the present invention, there is provided a memory information storage control method to be executed by a control unit which carries out a memory information storage process to generate memory information related to a program being executed by the control unit and to store the memory information, the memory information storage control method comprising an interface process to register a storage location of the memory information generated by the memory information storage process; a registering process to register a portable storage device as the storage location of the memory information using the interface process; and an executing process to confirm coupling of the portable storage device to the control unit and to register the storage location of the memory information in the detachably coupled portable storage device by the registering process.

Other objects and further features of the present invention will be apparent from the following detailed description when read in conjunction with the accompanying drawings.

DESCRIPTION OF THE PREFERRED EMBODIMENTS

A description will be given of embodiments of the control unit, the image processing apparatus, the memory information storage control method and the computer-readable storage medium according to the present invention, by referring to FIGS. 2 through 13.

Figure 1:
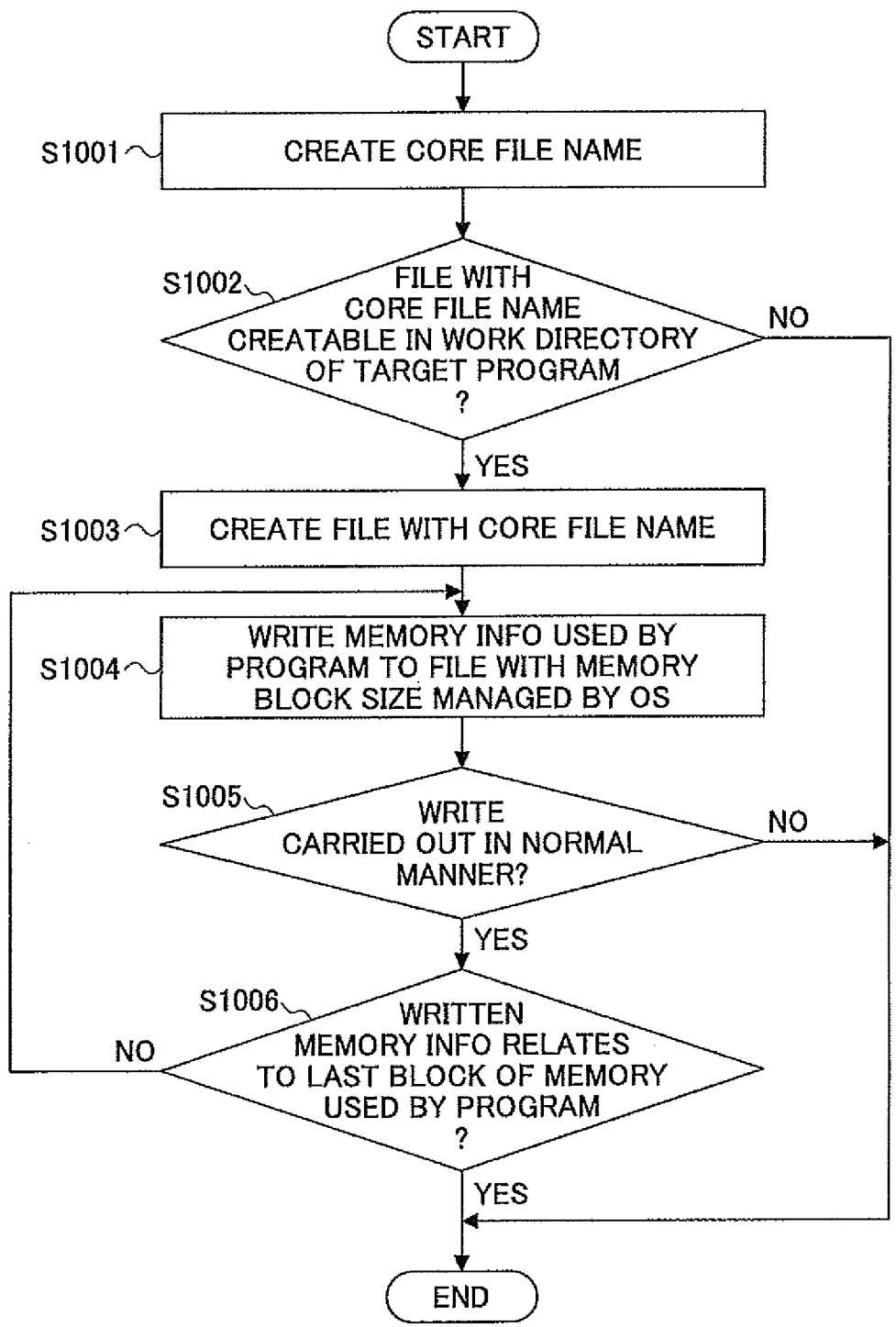
FIG. 1 is a flow chart for explaining an example of a conventional memory information storage process.
Figure 2:
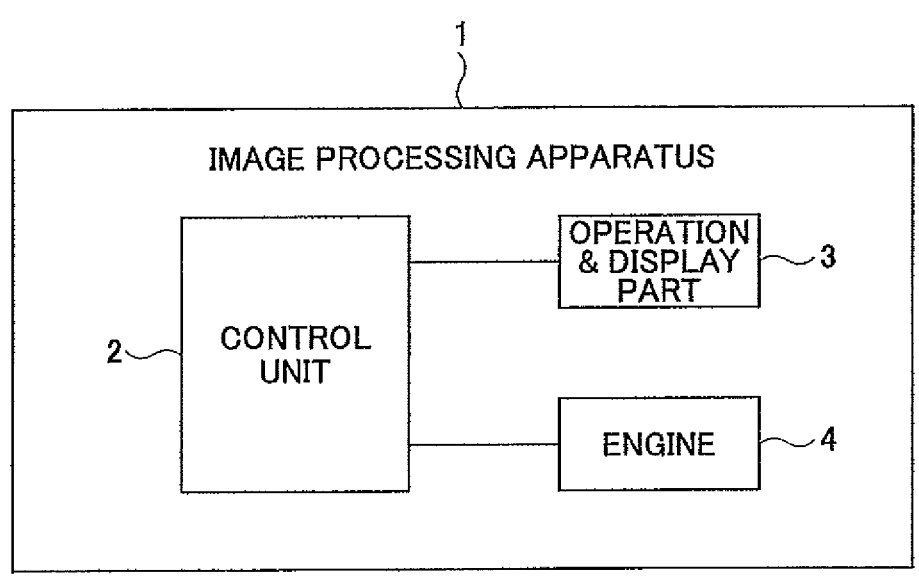
FIG. 2 is a block diagram showing a structure of a part of an image processing apparatus in one embodiment of the present invention.

FIG. 2 is a block diagram showing a structure of a part of an image processing apparatus in one embodiment of the present invention. In other words, one embodiment of the control unit, the image processing apparatus, the memory information storage control method and the computer-readable storage medium according to the present invention is applicable to an image processing apparatus 1 shown in FIG. 2.

The image processing apparatus 1 shown in FIG. 2 includes a controller 2, an operation and display part 3, and an engine 4. The controller 2 forms the control unit of this embodiment. The image processing apparatus 1 carries out image processes, such as those carried out by a printing apparatus, a copying apparatus, a facsimile apparatus, a Multi-Function Peripheral (MFP) and a scanner apparatus. Normally, the image processing apparatus 1 is connected to a host unit such as a computer or, is connected to a network.

The operation and display part 2 includes operation keys and a display, such as a Liquid Crystal Display (LCD). Various information and instructions for causing the image processing apparatus 1 to perform various operations may be input by the user by manipulating the operation keys. The display may display various information, including information and instructions input from the operation keys and information to be notified from the image processing apparatus 1 to the user.

The image processes of the image processing apparatus 1 are carried out using the engine 4. The engine 4 may include the functions of a read engine and/or a print engine. For example, the read engine is used in the scanner apparatus having a Charge Coupled Device (CCD), and reads a document image by scanning the document in a main scan direction and a sub scan direction and supplies the document image to the controller 2. The print engine forms or prints an image on a recording medium such as paper, based on image data received from the controller 2, according to a predetermined print system. For example, the print system may be an ink-jet system or an electrophotography system.

Figure 3:
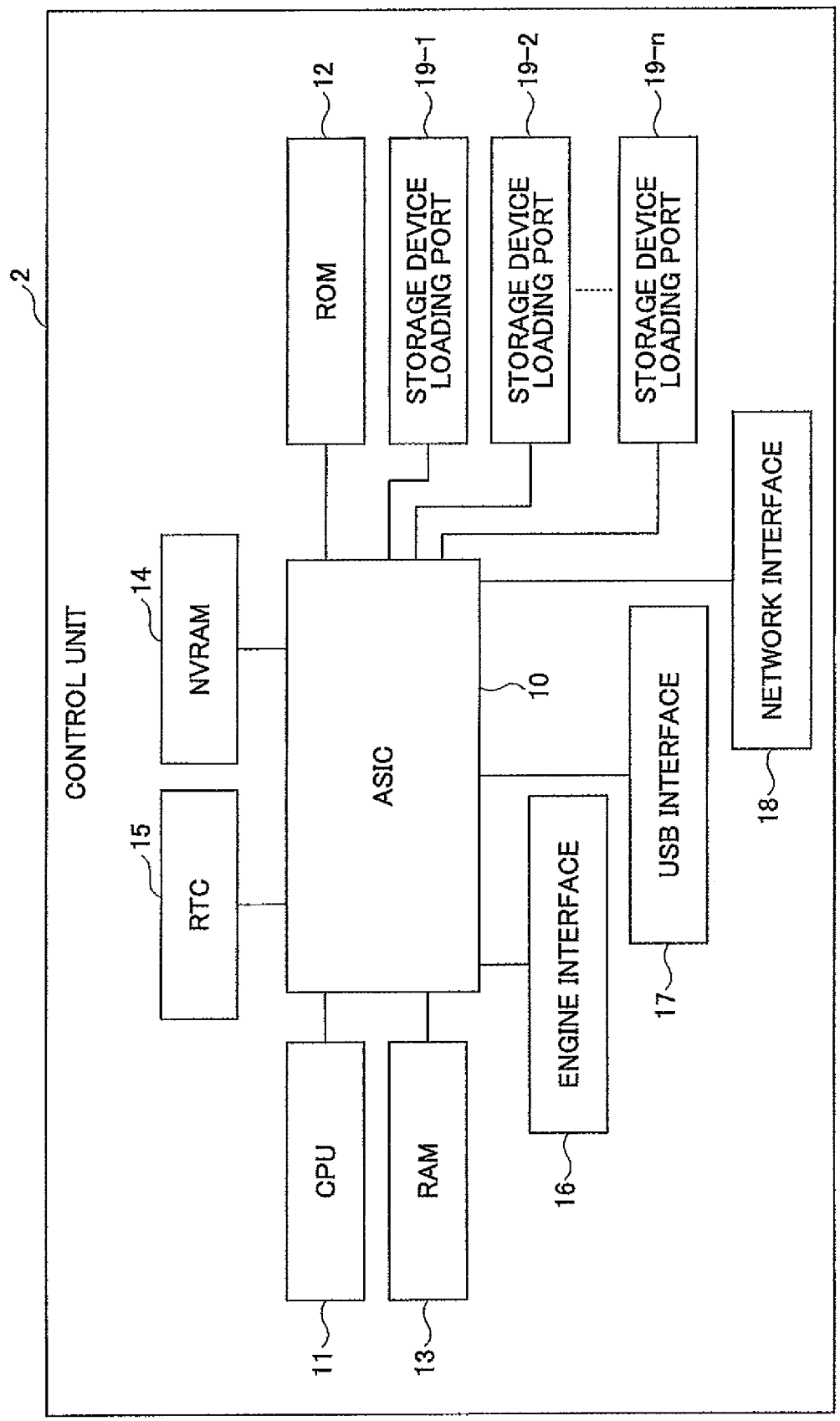
FIG. 3 is a block diagram showing a structure of a controller shown in FIG. 2.

FIG. 3 is a block diagram showing a structure of the controller 2 shown in FIG. 2. As shown in FIG. 3, the controller 2 includes an Application Specific Integrated Circuit (ASIC) 10, a Central Processing Unit (CPU) 11, a Read Only Memory (ROM) 12, a Random Access Memory (RAM) 13, a Non-Volatile Random Access Memory (NVRAM) 14, a Real Time Clock (RTC) 15, an engine interface 16, a Universal Serial Bus (USB) interface 17, a network interface 18, and a plurality of storage device loading ports 19-1 through 19-*n*, where n is a natural number greater than 1.

The ROM 12 stores programs and system data required to execute each of the programs. In this embodiment, the programs stored in the ROM 12 includes a basic program of the image processing apparatus 1, and a memory information storage control program. The memory information storage control program, which causes a computer to execute the memory information storage control method, will be described later. By using a rewritable flash ROM for the ROM 12, it becomes possible to appropriately update versions of the programs and the system data, and also easily add programs or software.

The image processing apparatus 1 may read the memory information storage control program from a computer-readable storage medium and install the memory information storage control program in the ROM 12. The computer-readable storage medium may be formed by any suitable media capable of storing the program in a manner readable by a computer or an information reading apparatus. Such media capable of storing the program in a computer-readable manner include ROMs, Electrically Erasable Programmable Read Only Memories (EEPROMs), Erasable Programmable Read Only Memories (EPROMs), flash memories, flexible disks, Compact Disk Read Only Memories (CD-ROMs), Compact Disk ReWritables (CD-RWs), Digital Versatile Disks (DVDs), Secure Digital (SD) cards, Magneto-Optic (MO) disks and the like.

The controller 2 forms the control unit which executes the memory information storage control program stored in the ROM 12, in order to execute the memory information storage control method which stores memory information of a memory region used by an application program when a preset abnormality is generated. For example, the preset abnormality is generated when the application program cannot be executed in a normal manner. The controller 2 stores the memory information in portable storage devices which are loaded with respect to the storage device loading ports 19-1 through 19-*n*.

For example, the memory information storage control program may be written in a legacy programming language, such as the assembler language, C language, C++ language, C# language and Java (registered trademark) language or, in an object oriented programming language. The memory information storage control program is computer-readable, and may be distributed on the computer-readable storage media, for example.

The CPU 11 uses the RAM 13 as a work memory, and executes the programs stored in the ROM 12 to carry out processes of the image processing apparatus 1, including a memory information storage control process which will be described later.

The RAM 13, which is used by the CPU 11 as the work memory, stores various information including intermediate information obtained during various operations carried out by the CPU 11.

The ASIC 10 is a customized IC having hardware elements for executing various image processes and data input and/or input (I/O) processes. The ASIC 10 controls the functions of and/or exchange of information with the USB interface 16, the engine interface 17, the network interface 18, and the storage device loading ports 19-1 through 19-*n*.

The NVRAM 14 maintains the contents stored therein even when the power of the image processing apparatus 1 is turned OFF. Hence, the NVRAM 14 stores information which needs to be maintained even when the power of the image processing apparatus 1 is OFF, under the control of the image processing apparatus 1.

The RTC 15 includes an oscillator circuit, a frequency divider circuit and the like, and executes various timer functions such as keeping the present time. The CPU 11 uses the present time and the timer functions of the RTC 15 when executing various processes of the image processing apparatus 1, including the memory information storage process which will be described later.

The engine interface 16 is connected to the engine 4 shown in FIG. 2. The engine interface 16 supplies control signals and video signals to the engine 4, and receives status signals and read image data from the engine 4.

The USB interface 17 is connected to a host computer (not shown) or a USB device (not shown) via a USB cord or cable, and exchanges data between the host computer or USB device.

The network interface 18 is connected to a network such as the Internet, and receives data transmitted from the host computer via the network and transmits data to the host computer via the network.

A portable storage device 30 (not shown in FIG. 3) is detachably loadable with respect to (that is, can be detachably coupled to) each of the storage device loading ports 19-1 through 19-*n*. The portable storage device 30 will be described later in conjunction with FIGS. 5 and 7. The memory information storage process stores the memory information in the portable storage device 30 which is loaded with respect to the corresponding one of the storage device loading ports 19-1 through 19-*n*.

The portable storage device 30 may be formed by any suitable media that is detachably loadable with respect to the corresponding one of the storage device loading ports 19-1 through 19-*n*, such as external memories and portable recording media. The external memories include a smart media, Compact Flash (CF, registered trademark), Multi-Media Cards (MMCs), SD cards, Memory Sticks (MSs) and the like which can be inserted directly into slots of the storage device loading ports 19-1 through 19-n. The portable recording media include DVDs, Compact Disk Recordables (CD-Rs) CD-RWs, hard disks and the like which can be loaded with respect to the storage device loading ports 19-1 through 19-n.

Figure 4:
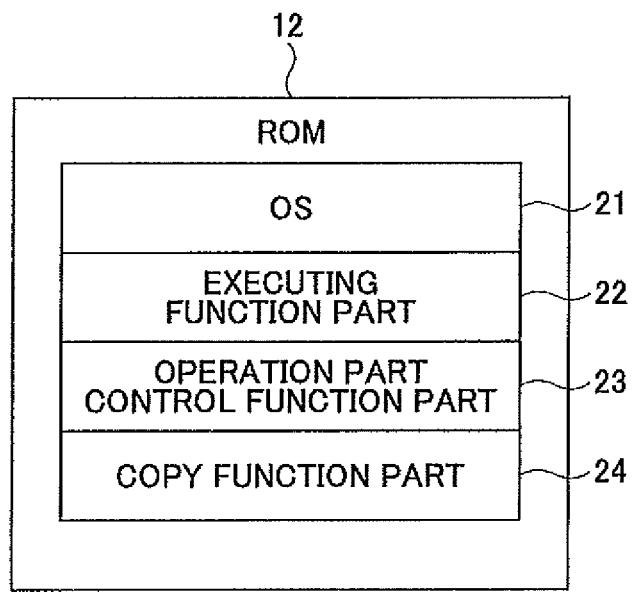
FIG. 4 is a diagram showing a program arrangement in a ROM shown in FIG. 3.

An OS 21, an executing function part 22, an operation part control function part 23 and a copy function part 24, which are programs, are stored in the ROM 12 of the controller 2 as shown in FIG. 4. FIG. 4 is a diagram showing a program arrangement in the ROM 12 shown in FIG. 3. For example, the UNIX OS is used for the OS 21.

When the power of the image processing apparatus 1 is turned ON, the CPU 11 reads the OS 21 from the ROM 12 into the RAM 13, and starts executing the OS 21. When the OS 21 is executed, the copy function part 24 and the operation part control function part 23 are read from the ROM 12 into the RAM 13 depending on the configuration of the image processing apparatus 1, and the copy function part 24 and the operation part control function part 23 are executed.

The executing function part 22 forms an executing means (or part) having a function to read an executing program (application program) other than the OS 21 from the ROM 12 and to start execution of the executing program, and a function to detect an error generated during execution of the executing program or an end of execution of the executing program. The executing function part 22 also has a function to monitor the loading of the portable storage device 30 with respect to each of the storage device loading ports 19-1 through 19-n, to issue a mount process request for the portable storage device 30 with respect to the OS 21, and to execute a registering function part 31 which will be described later.

The operation part control function part 23 has an application function to display a state of the image processing apparatus 1 on the display of the operation and display part 3, to interpret information or instructions input from the operation keys of the operation and display part 3, and to execute a process based on the interpretation of the input information or instructions input from the operation keys.

The copy function part 24 has an application function to control the engine 4 and to execute the copy function. For the sake of convenience, FIG. 4 only shows the operation part control function part 23 and the copy function part 24 as the basic functions of the image processing apparatus 1. However, the image processing apparatus 1 may be provided with other basic functions, such as the print function, scanner function and the facsimile function.

Figure 5:
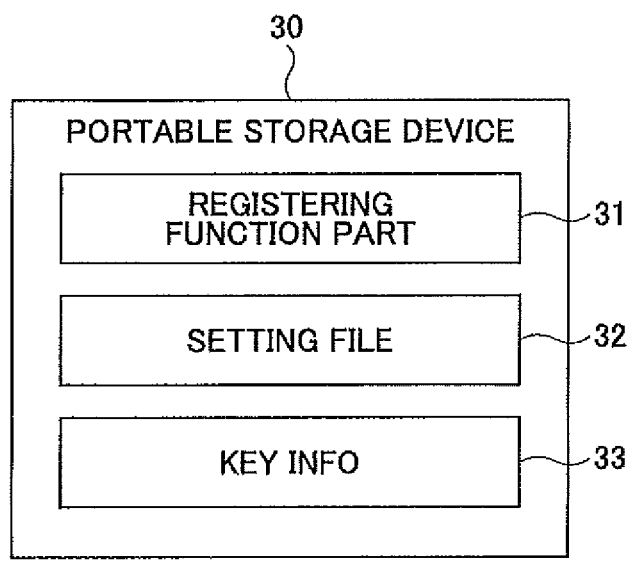
FIG. 5 is a diagram showing a storage state of a portable storage device which is loaded with respect to a storage device loading port shown in FIG. 3.

FIG. 5 is a diagram showing a storage state of the portable storage device 30 which is loaded with respect to the storage device loading port shown in FIG. 3. As shown in FIG. 5, the portable storage device 30 stores a registering function part 31, a setting file 32, and key information 33. The registering function part 31 forms a registration means (or part) to register a storage location of the memory information (hereinafter also referred to as a memory information storage location). The setting file 32 is used by the registering function part 31, and the memory information storage location which is to be registered is written in the setting file 31 by the user in advance. In a case where the user does not specify the memory information storage location, the setting file 32 does not need to be stored in the portable storage device 30.

Figure 6:
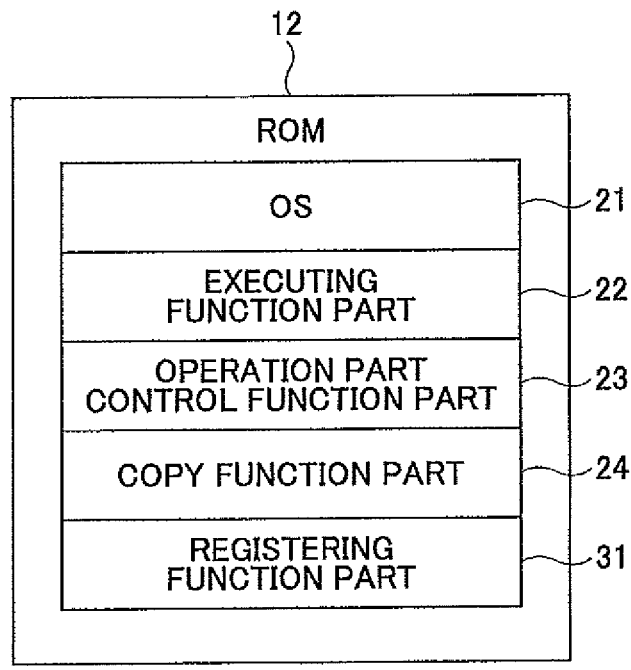
FIG. 6 is a diagram showing another program arrangement in the ROM shown in FIG. 3.
Figure 7:
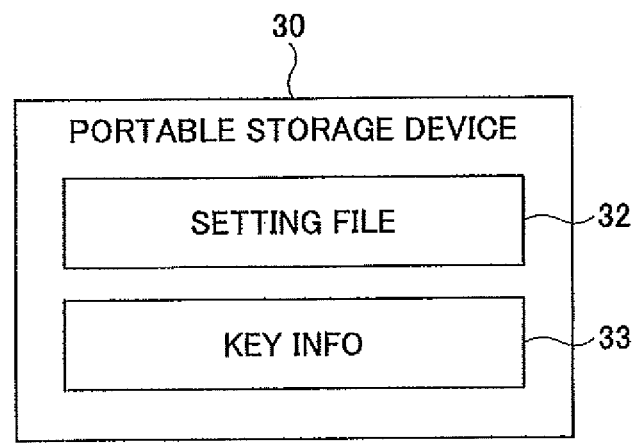
FIG. 7 is a diagram showing another storage state of the portable storage device which is loaded with respect to the storage device loading port shown in FIG. 3.

The registering function part 31 does not have to be stored in the portable storage device 30, as may be seen from FIGS. 6 and 7, for example. FIG. 6 is a diagram showing another program arrangement in the ROM 12 shown in FIG. 3, and FIG. 7 is a diagram showing another storage state of the portable storage device 30 which is loaded with respect to the storage device loading port shown in FIG. 3. As shown in FIGS. 6 and 7, the registering function part 31 is stored in the ROM 12, and the setting file 32 and the key information 33 are stored in the portable storage device 30.

The key information 33 indicates that the portable storage device 30 is for storing the memory information. The key information 33 may be omitted if the storage destination of the memory information is not limited to the portable storage device 30. However, in the case where the registering function part 31 is stored in the image processing apparatus 1 and not in the portable storage device 30 as shown in FIGS. 6 and 7, the storage destination of the memory information may be limited to the portable storage device 30 which stores the key information 33, so that the memory information will not be unwillingly or unknowingly stored in the portable storage device 30 which does not store the key information 33 in order to prevent leaking of the memory information to a third party and improve security.

As described above, when the power of the image processing apparatus 1 is turned ON, the CPU 11 reads the OS 21 from the ROM 12 into the RAM 13, and the execution of the OS 21 is started. Then, depending on the configuration of the image processing apparatus 1, the copy function part 24 and the operation part control function part 23 are read from the ROM 12 into the RAM 13, and the copy function part 24 and the operation part control function part 23 are executed.

Figure 8:
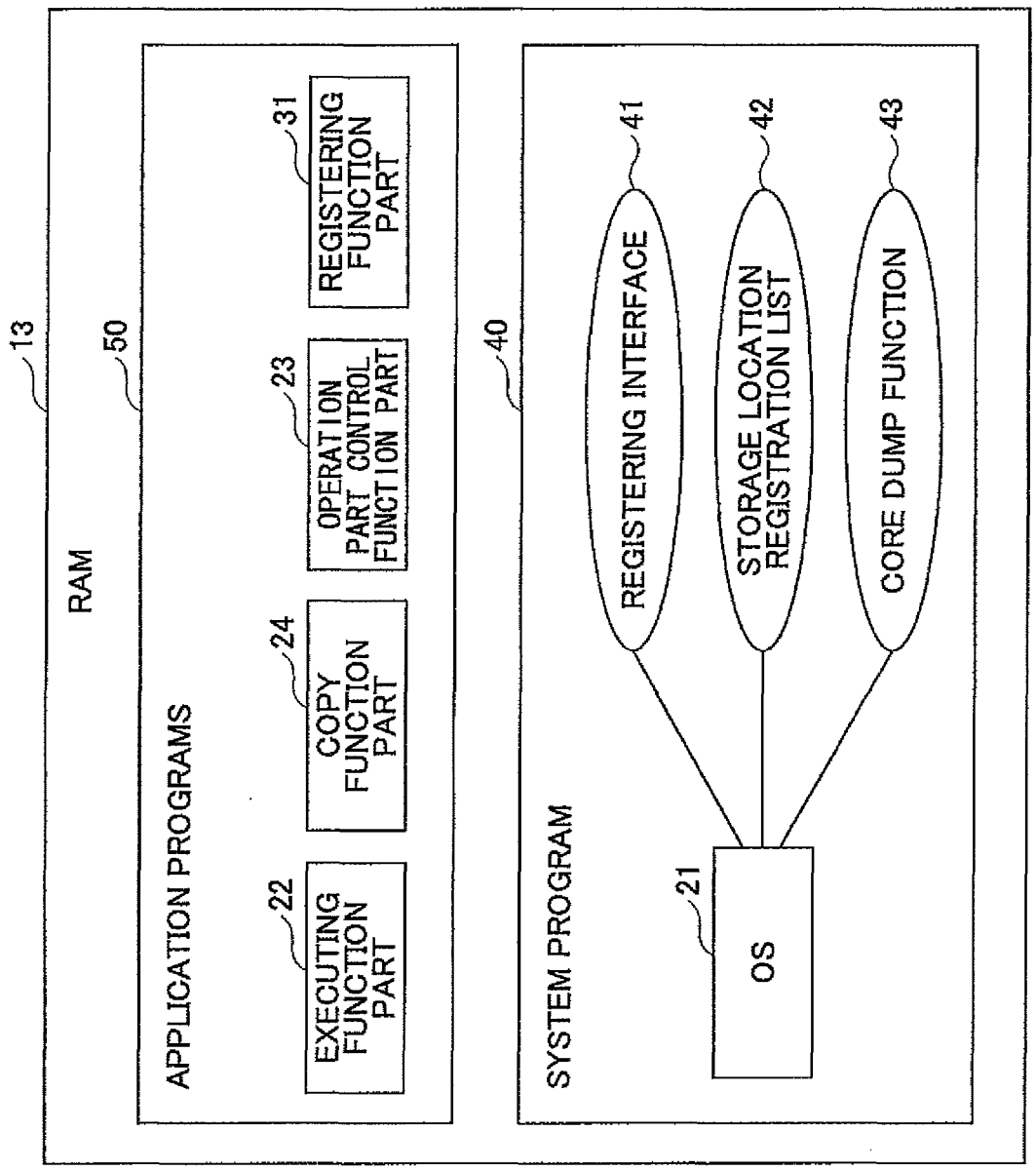
FIG. 8 is a diagram showing a program arrangement in a RAM shown in FIG. 3.

In other words, system programs 40 and application programs 50 are arranged in the RAM 13 as shown in FIG. 8. FIG. 8 is a diagram showing a program arrangement in the RAM 13 shown in FIG. 3. The system programs 40 include the OS 21. This OS 21 includes a registration interface 41 which forms an interface means (or part) to register the memory information storage location, a storage location registration list 42 to store the registered storage locations, and a core dump function 43 which forms a memory information storing means (or part) to generate the memory information related to the program (in the memory) which is being executed and to carry out a memory information storage process that stores the memory information to the registered memory information storage location.

The application programs 40 include the executing function part 22, the operation part control function part 23, the copy function part 24 and the registering function part 31. The registering function part 31 exists in the RAM 13 only when carrying out the memory information storage location registration process, and does not always exist in the RAM 13.

Next, a description will be given of the operation of this embodiment. In this embodiment, if a preset abnormality is generated during execution of the application program in the image processing apparatus 1, the controller 2 carries out the memory information storage process to store the memory information in at least one portable storage device 30 which is loaded with respect to the corresponding one of the storage device loading ports 19-1 through 19-n. But prior to this memory information storage process, a memory information storage control process is carried out. This memory information storage control process carries out the memory information storage location registration process to register the portable storage device 30 as the memory information storage location.

[Memory Information Storage Location Registration Process]

Figure 9:
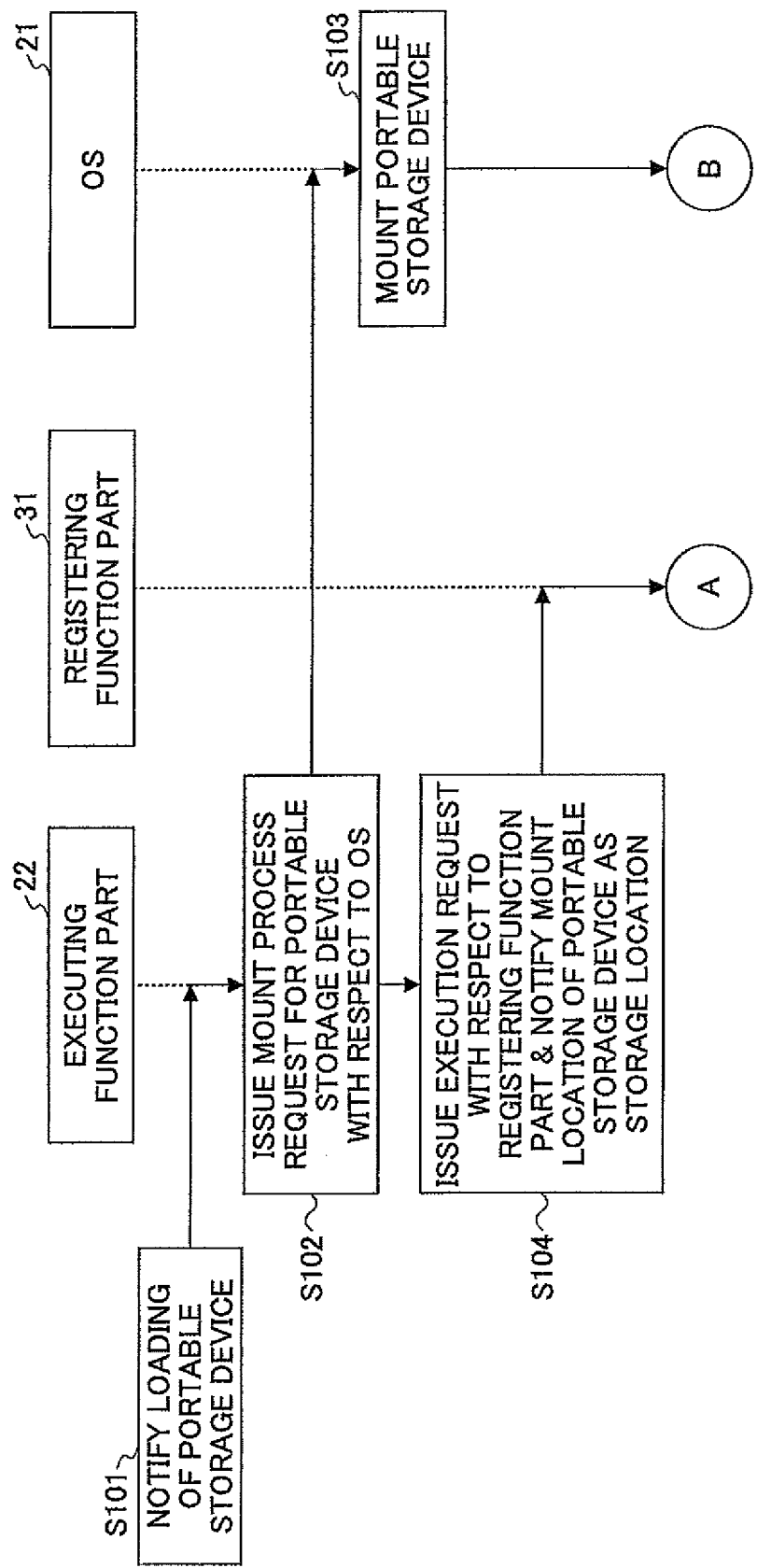
FIG. 9 is a flow chart for explaining a portion of a memory information storage location registration process of the controller shown in FIG. 3.
Figure 10:
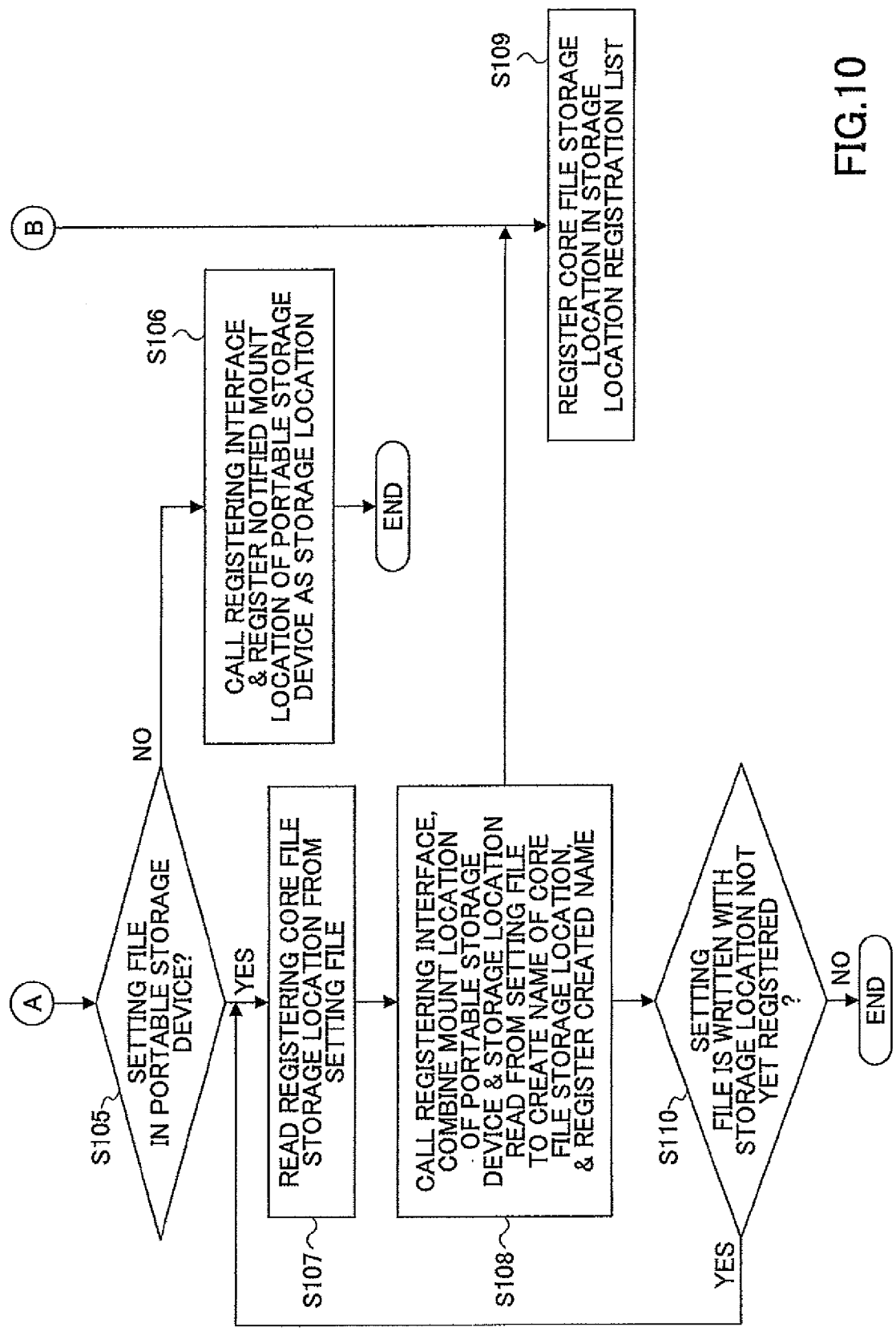
FIG. 10 is a flow chart showing a remaining portion of the memory information storage location registration process of the controller shown in FIG. 3.

First, a description will be given of the memory information storage location registration process which registers the memory information in the portable storage device 30, by referring to FIGS. 9 and 10. FIGS. 9 and 10 are flow charts for explaining the memory information storage location registration process of the controller 2 shown in FIG. 3.

Each of the storage device loading ports 19-1 through 19-n which is loaded with the portable storage device 30 makes a load notification to notify the executing function part 22 that the portable storage device 30 is loaded thereto, in a step S101 shown in FIG. 9. The executing function part 22 issues a mount process request for the portable storage device 30 with respect to the OS 21 in response to the load notification, in a step S102. The OS 21 carries out a mount process to mount the portable storage device 30 in response to the mount process request, in a step S103.

The executing function part 22 issues an execution request with respect to the registering function part 31, and makes a mount location notification to notify the mount location where the loaded portable storage device 30 is mounted in the file system of the OS 21 with respect to the registering function part 31, in a step S104.

Next, as shown in FIG. 10, the registering function part 31 decides whether the setting file 32 exists within the loaded portable storage device 30, in a step S105. If the setting file 32 does not exist in the loaded portable storage device 30 and the decision result in the step S105 is NO, the registering function part 31 uses the registration interface 41 which is provided from the OS 21 to register the mount location of the portable storage device 30 notified by the mount location notification from the executing function part 22, as the memory information storage location (or core file storage location), in a step S106, and the memory information storage location registration process ends.

Prior to deciding whether the setting file 32 exists within the loaded portable storage device 30 in the step S105, the registering function part 31 may check whether the key information 33, which indicates that the portable storage device 30 is for use in storing the memory information, exists. In this case, the registering function part 31 may decide whether the setting file 32 exists within the loaded portable storage device 30, by determining that the portable storage device 30 is for use in storing the memory information provided that the key information 33 exists.

If the setting file 32 exists and the decision result in the step S105 is YES, the registering function part 31 reads the memory information storage location (or core file storage location) from the setting file 32, in a step S107. Then, the executing function part 22 combines the mount location of the portable storage device 30 received by the mount location notification and the memory information storage location (or core file storage location) read from the setting file 32, and creates a name of the memory information storage location (or core file storage location) in the portable storage device 30, in a step S108. In addition, the executing function part 22 uses the registration interface 41 which is provided from the OS 21 to register the name of the memory information storage location (or core file storage location) that is created, in the step S108.

When the registration interface 41 is used, the OS 21 registers the memory information storage location (or core file storage location) which is supplied to the registration interface 41 into the storage location registration list 42 within the OS 21, in a step S109 as shown in FIG. 10.

When the registration to the storage location registration list 42 is completed, the registering function part 31 decides whether the setting file 32 includes a memory information storage location (or core file storage location) for which the memory information storage location registration process has not been carried out, in a step S110. If the setting file 32 includes a memory information storage location (or core file storage location) for which the memory information storage location registration process has not been carried out and the decision result in the step S110 is YES, the process returns to the step S107 to carry out the steps S107 through S110.

The registering function part 31 repeats the processes of the steps S107 through 110 for the number of memory information storage locations (or core file storage locations) stored in the setting file 32 and for which the memory information storage location registration process has not been carried out. If the setting file 32 includes no memory information storage location (or core file storage location) for which the memory information storage location registration process has not been carried out and the decision result in the step S110 is NO, the memory information storage location registration process ends.

Figure 11:
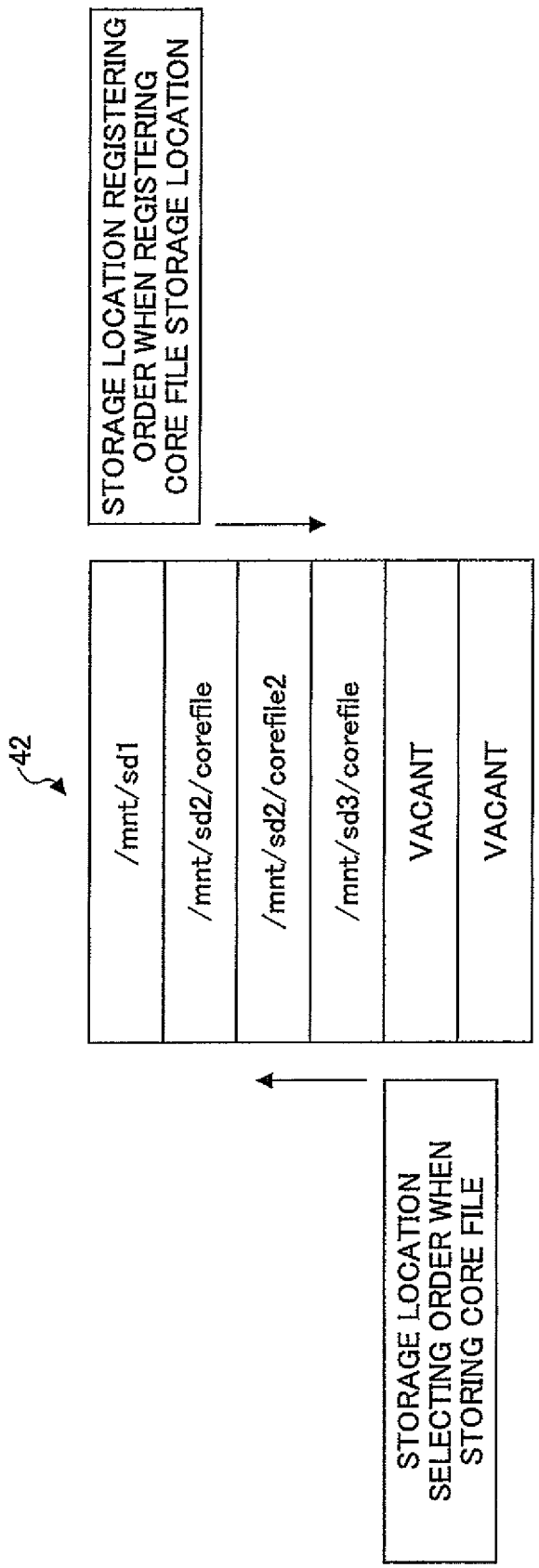
FIG. 11 is a diagram for explaining a storage location registration sequence of memory information to a storage location registration list, and a storage location selection sequence at a time of storing the memory information.

Furthermore, when the registration interface 41 is used, the OS 21 registers the memory information storage location (or core file storage location) which is supplied to the registration interface 41 into the storage location registration list 42 within the OS 21. When registering the memory information storage locations (or core file storage locations) in this storage location registration list 42, the memory information storage locations (or core file storage locations) may be registered in an order with which the registration request is made using the registration interface 41 or, in an order according to an address the memory information storage locations (or core file storage locations) starting from a smallest address, as shown in FIG. 11, for example. FIG. 11 is a diagram for explaining a storage location registration sequence of the memory information to the storage location registration list 42, and a storage location selection sequence at a time of storing the memory information. In FIG. 11, the order according to the address is from the top to bottom in FIG. 11, where the address is larger towards the bottom of the storage location registration list 42. On the other hand, when storing the memory information, the storage locations are selected in an order which is in reverse to (that is, in a reverse order compared to) the order with which the memory information storage locations are registered.

[Memory Information Storage Process]

Figure 12:
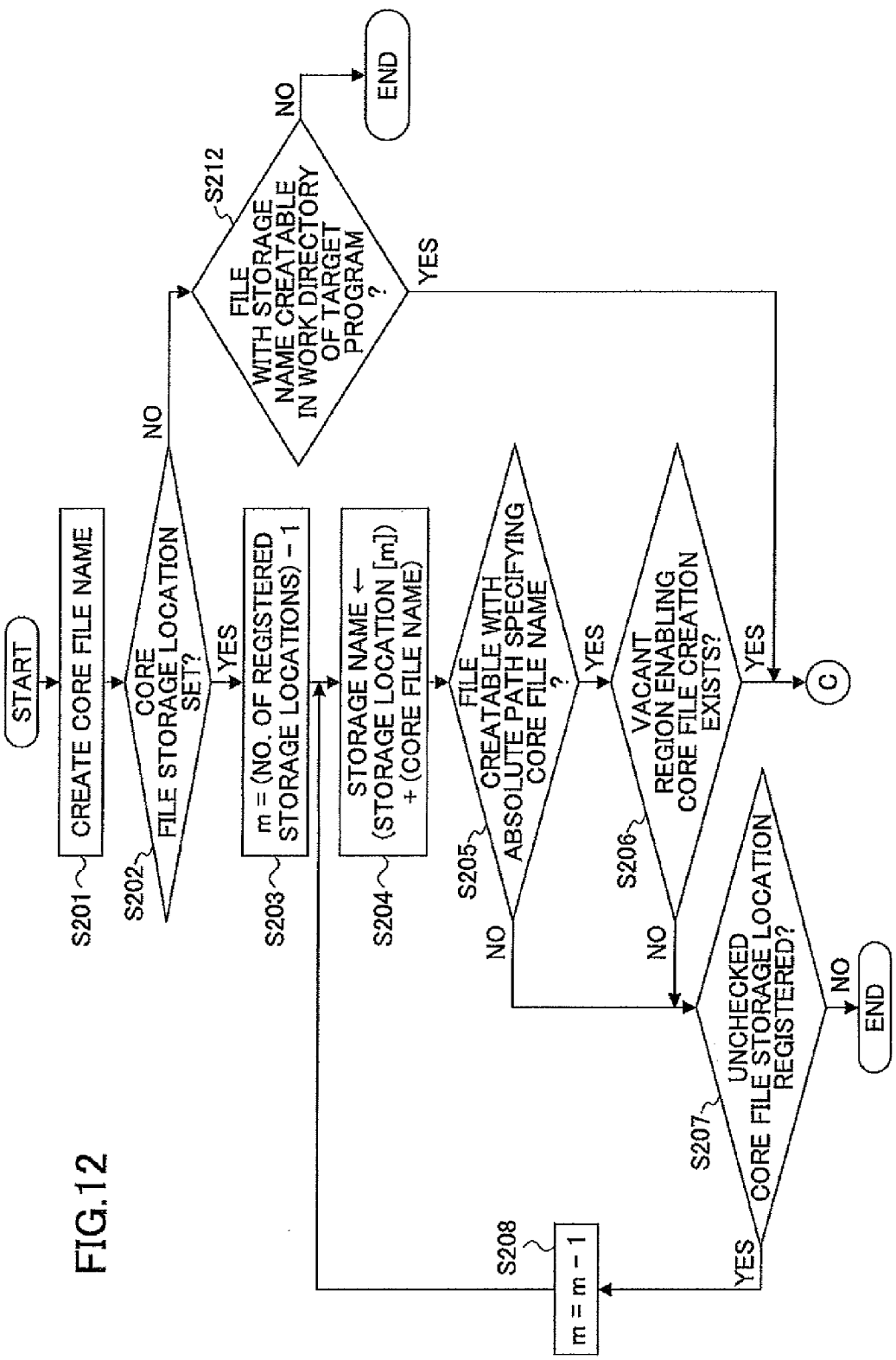
FIG. 12 is a flow chart for explaining a portion of a memory information storage process of the controller shown in FIG. 3.
Figure 13:
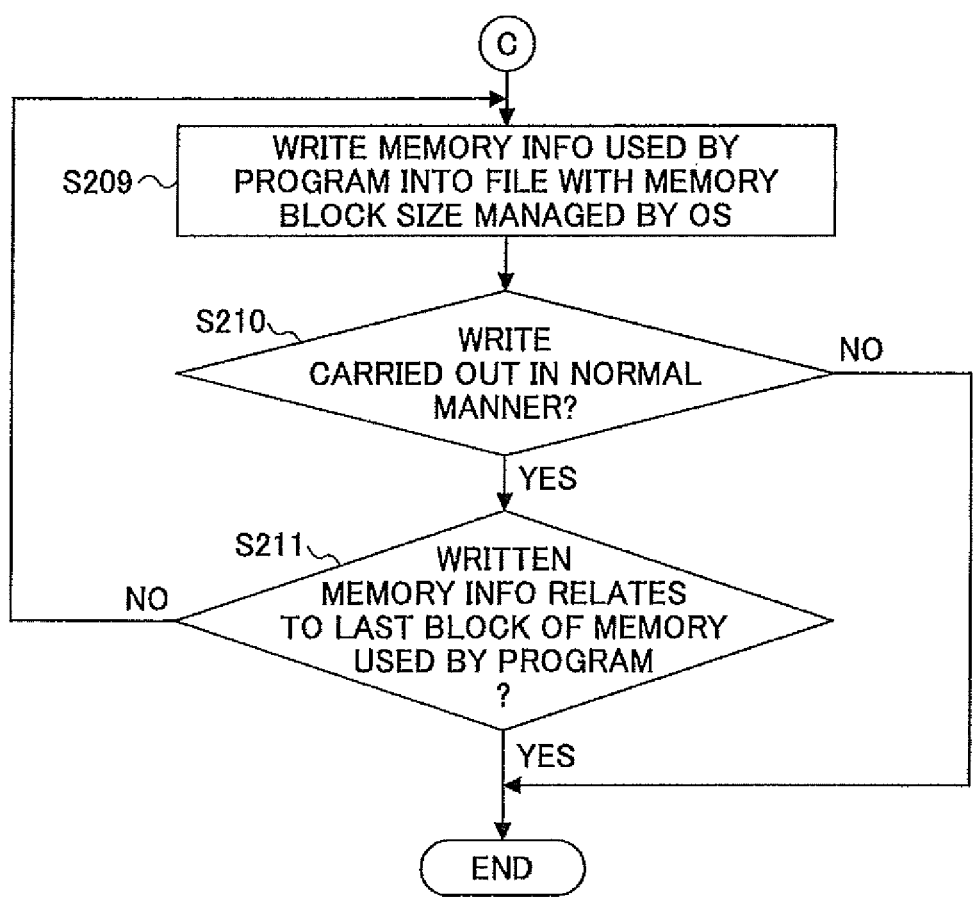
FIG. 13 is a flow chart for explaining a remaining portion of the memory information storage process of the controller shown in FIG. 3.

Next, a description will be given of the memory information storage process to store the memory information, by referring to FIGS. 12 and 13. FIGS. 12 and 13 are flow charts for explaining the memory information storage process of the controller 2 shown in FIG. 3.

A preset abnormality requires the memory information storage process (or core dump process) to be executed. When such a preset abnormality is generated during execution of an application program 50, the OS 21 calls the core dump function part 43, and the core dump function part 43 creates a name of a memory information file (or core file) which is to be created, in a step S201 shown in FIG. 12. The core dump function part 43 uses the name, the process ID and the like of the application program 50 which generated the preset abnormality when creating the memory information file name (or core file name).

Next, the core dump function part 43 decides whether the memory information storage location (or core file storage location) has been set, in a step S202. If the decision result in the step S202 is YES, the core dump function part 43 registers, as a variable m, a value which is obtained by decrementing the number of registered memory information storage locations by "1", in a step S203. In addition, the core dump function part 43 creates a storage name for the memory information file (or core file) from the variable m and the memory information file name (or core file name), in a step S204. In this embodiment, the core dump function part 43 creates the storage name for the memory information file (or core file), including the memory information storage location, from the memory information file name (or core file name) created in the step S201 and the storage location registration list 42. As described above, the memory information storage location is selected from the storage location list 42 in the order which is in reverse to the order with which the memory information storage locations are registered. In other words, the memory information storage locations are selected from the storage location list 42 starting from the memory information storage location which is registered last towards the memory information storage location which is registered first in the storage location list 42.

Thereafter, the core dump function part 43 attempts to create the memory information file (or core file) with the memory information file name (or core file name) including the memory information storage location, that is, an absolute path specifying core file name, and decides whether the memory information file can be created, in a step S205. If the memory information file can be created and the decision result in the step S205 is YES, the core dump function part 43 decides whether a vacant region which enables the memory information file (or core file) to be created exists in the memory information storage location which is selected as a memory information file (or core file) creating location, in a step S206.

If the decision result in the step S205 is NO or, there is no vacant region in the selected memory information file (or core file) storage location and the decision result in the step S206 is NO, the core dump function part 43 decides whether an unchecked memory information storage location (or core file storage location) is registered in the storage location registration list 42, in a step S207. If an unchecked memory information storage location (or core file storage location) is registered in the storage location registration list 42 and the decision result in the step S207 is YES, the core dump function part 43 sets, as the variable m, a value which is obtained by decrementing the variable m by "1", in a step S208. The process returns to the step S204 after the step S208, to carry out the steps S204 through S208 with the decremented variable m.

On the other hand, if an unchecked memory information storage location (or core file storage location) is not registered in the storage location registration list 42 and the decision result in the step S207 is NO, the core dump function part 43 judges that the memory information cannot be stored, and the memory information storage process (or core dump process) ends.

If there is a vacant region in the selected memory information file (or core file) storage location and the decision result in the step S206 is YES, the core dump function part 43 writes the memory information used by the application program which generated the preset abnormality into the created memory information file (or core file) with a memory block size which is managed by the OS 21, in a step S209 shown in FIG. 13. Then, the core dump function part 43 decides whether the memory information is written into the memory information file (or core file) in a normal manner, in a step S210.

If the memory information is not written into the memory information file (or core file) in the normal manner and the decision result in the step S210 is NO, the core dump function part 43 judges that the memory information cannot be stored, and the memory information storage process (or core dump process) ends.

If the memory information is written into the memory information file (or core file) in the normal manner and the decision result in the step S210 is YES, the core dump function part 43 decides whether the written memory information corresponds to the last block of the memory used by the application program, in a step S211. If the written memory information does not correspond to the last block of the memory used by the application program and the decision result in the step S211 is NO, the process returns to the step S209 to carry out the steps S209 through S211.

On the other hand, if the written memory information corresponds to the last block of the memory used by the application program and the decision result in the step S211 is YES, the core dump function part 43 judges that the memory information storage has been carried out to the end in a normal manner, and the memory information storage process (or core dump process) ends.

Returning now to the description of FIG. 12, if the memory information storage location (or core file storage location) has not been set and the decision result in the step S202 is NO, the core dump function part 43 decides whether a file of the storage name can be created in a work directory of the application program which is the target of the memory information storage process, in a step S212. If the file can be created and the decision result in the step S212 is YES, the process advances to the step S209 shown in FIG. 13, to carry out the steps S209 through S211 as described above.

If the file cannot be created and the decision result in the step S212 is NO, the core dump function part 43 judges that the memory information cannot be stored, and the memory information storage process (or core dump process) ends.

Therefore, in this embodiment, the image processing apparatus 1 generates the memory information related to the application program 50 (in the memory) which is being executed and carries out the memory information storage process to store the memory information in the portable storage device 30 which is detachable with respect to the information processing apparatus 1. In addition, the image processing apparatus 1 registers the portable storage device 30 as the storage location of the memory information (memory information storage location) generated by the memory information storage process, when the loading of the portable storage device 30 with respect to the image processing apparatus 1 is confirmed. The loading of the portable storage device 30 with respect to the image processing apparatus 1 may be confirmed by a known means.

Accordingly, the memory information can be stored positively at a low cost (that is, inexpensively) in the portable storage device 30, without limiting the amount of memory information to be stored and without having to connect to a network. Consequently, it is possible to reduce the time required to analyze the generated abnormality, and to improve the utilization efficiency of the image processing apparatus 1 at a low cost.

In addition, when the registering function part 31 is installed in the controller 2 of the image processing apparatus 1 in this embodiment, the portable storage device 30 for use in storing the memory information may be used in common among a plurality of kinds of image processing apparatuses which are developing targets. For this reason, it is unnecessary to prepare a large number or a large number of kinds of portable storage devices 30 for the purposes of acquiring the memory information, and the time and cost required to analyze the abnormalities can be reduced.

Moreover, when the registering function part 31 is installed in the portable storage device 30 which is loaded with respect to the image processing apparatus 1 in this embodiment, the loaded portable storage device 30 is registered as the memory information storage location.

Hence, it is possible to store the memory information in the portable storage device 30 only if the registering function part 31 is installed in this portable storage device 30. In other words, the memory information will not be unwillingly or unknowingly stored in the portable storage device 30 which is not installed with the registering function part 31 in order to prevent leaking of the memory information to a third party and improve security.

On the other hand, when the registering function part 31 is installed in the image processing apparatus 1 in this embodiment, the registering function part 31 may decide whether the key information 33, which indicates that the portable storage device 30 is for used in storing the memory information, is prestored in this portable storage device 30 which is loaded with respect to the image processing apparatus 1, and register this portable storage device 30 as the memory information storage location provided that the key information 33 is stored in this portable storage device 30.

In this case, it is possible to store the memory information in the portable storage device 30 only if the key information 33 is stored in this portable storage device 30. In other words, the memory information will not be unwillingly or unknowingly stored in the portable storage device 30 which does not store the key information 33 in order to prevent leaking of the memory information to a third party and improve security.

When the setting file 32 which specifies the storage location is stored in the portable storage device 30 which is loaded with respect to the image processing apparatus 1 in this embodiment, the registering function part 31 may refer to the storage location specified by the setting file 32 as the memory information storage location.

In this case, it is possible to register an appropriate location desired by the user as the memory information storage location, using the setting file 32. For example, it is possible to avoid a plurality of memory information from coexisting in the same storage region, and to reduce the time required to analyze the abnormality.

Furthermore, in the image processing apparatus 1 in this embodiment, the registering function part 31 may register a plurality of memory information storage locations.

Consequently, a plurality of portable storage devices 30 may be used for storing the memory information. Even when it is necessary to simultaneously acquire a plurality of memory information, it is possible to prevent an undesirable situation where the memory information acquisition fails due to lack of storage capacity of the portable storage device 30. As a result, the time required to study and analyze the abnormality can be reduced.

Moreover, when a plurality of memory information storage locations are registered, the core dump function part 43 of the image processing apparatus 1 in this embodiment checks whether the memory information is storable in the memory information storage locations, in an order in reverse to the order with which the memory information storage locations are registered, and stores the memory information in the storable memory information storage locations.

For this reason, it is possible to select the memory information storage location from the newly registered memory information storage locations, and to store the memory information in the portable storage device 30 which is loaded by the user who is actually performing the analyzing operation and has a high possibility of being a valid memory information storage location, by reflecting the desires of the user who is performing the analyzing operation. Hence, it is possible to prevent a situation where the memory information cannot be store in the portable storage device 30 which is loaded with respect to the image processing apparatus 1, and it is possible to reduce the time required to analyze the generated abnormality.

In addition, in this embodiment, the controller 2 is provided as the control unit in the image processing apparatus 1 which carries out a predetermined image process with respect to the image data. Accordingly, it is possible to appropriately store the memory information which is necessary to analyze the operations of the image processing apparatus 1, into the portable storage device 30, and positively and efficiently analyze the image processing apparatus 1.

In this embodiment, the UNIX OS is used for the OS 21 of the image processing apparatus 1, and the core dump process, which is a memory information storage process, is carried out by utilizing the functions of the OS 21.

For this reason, the information necessary for the abnormality analysis may be acquired with a generally employed format, and it is possible to use existing software for analyzing the acquired information. As a result, the memory information storage control method in accordance with the present invention may be utilized with ease in a simple manner.

Of course, the OS 21 is not limited to the UNIX OS. Any suitable OS which has the memory information storage function or, is capable of adding the memory information storage function by the application program, may be used for the OS 21.

This application claims the benefit of a Japanese Patent Application No. 2008-015845 filed on Jan. 28, 2008, in the Japanese Patent Office, the disclosure of which is hereby incorporated by reference.

Further, the present invention is not limited to these embodiments, but various variations and modifications may be made without departing from the scope of the present invention.

What is claimed is:

1. A control unit comprising:
a memory configured to store a program;
a processing unit configured to execute the program stored in the memory;
a memory information storage part configured to carry out a memory information storage process which generates memory information related to a memory region used by the program that is being executed by the processing unit and stores the memory information;
an interface part configured to register a storage location of the memory information generated by the memory information storage part;
a loading part including a plurality of ports, configured to make a notification when a portable storage device is detachably connected to the control unit via one of the plurality of ports;
a registering part configured to register the portable storage device as the storage location of the memory information using the interface part; and,
an executing part configured to register the storage location of the memory information in the portable storage device by the registering part when the notification is received from the loading part.

2. The control unit as claimed in claim 1, wherein the registering part registers the portable storage device as the storage location of the memory information when the portable storage device prestores key information indicating that the storage device is for use in storing the memory information.

3. The control unit as claimed in claim 1, wherein the registering part is installed in the portable storage device.

4. The control unit as claimed in claim 1, wherein the registering part refers to a storage location stored in a setting file which specifies the storage location, as the storage location of the memory information, when the portable storage device stores the setting file.

5. The control unit as claimed in claim 1, wherein the registering part registers a plurality of storage locations of the memory information.

6. The control unit as claimed in claim 5, wherein the memory information storage part checks whether the memory information is storable in the plurality of storage locations in an order in reverse to an order with which the plurality of storage locations are registered, and stores the memory information in a storable one of the plurality of storage locations.

7. The control unit as claimed in claim 1, wherein the processing unit generates the memory information when an abnormality is detected during execution of the program.

8. An image processing apparatus comprising:
an engine configured to carry out an image process; and
a control unit coupled to the engine,
said control unit comprising:
a memory configured to store a program;
a processing unit configured to execute the program stored in the memory;
a memory information storage part configured to carry out a memory information storage process which generates memory information related to a memory region used by the program that is being executed by the processing unit and stores the memory information;
an interface part configured to register a storage location of the memory information generated by the memory information storage part;
a loading part including a plurality of ports, configured to make a notification when a portable storage device is detachably connected to the control unit via one of the plurality of ports;
a registering part configured to register the portable storage device as the storage location of the memory information using the interface part; and
an executing part configured to register the storage location of the memory information in the portable storage device by the registering part when the notification is received from the loading part.

9. The image processing apparatus as claimed in claim 8, wherein the registering part registers the portable storage device as the storage location of the memory information when the portable storage device prestores key information indicating that the storage device is for use in storing the memory information.

10. The image processing apparatus as claimed in claim 8, wherein the registering part is installed in the portable storage device.

11. The image processing apparatus as claimed in claim 8, wherein the registering part refers to a storage location stored in a setting file which specifies the storage location, as the storage location of the memory information, when the portable storage device stores the setting file.

12. The image processing apparatus as claimed in claim 8, wherein the registering part registers a plurality of storage locations of the memory information.

13. The image processing apparatus as claimed in claim 12, wherein the memory information storage part checks whether the memory information is storable in the plurality of storage locations in an order in reverse to an order with which the plurality of storage locations are registered, and stores the memory information in a storable one of the plurality of storage locations.

14. The image processing apparatus as claimed in claim 8, wherein the processing unit of the control unit generates the memory information when an abnormality is detected during execution of the program.

15. A non-transitory computer-readable storage medium that stores a program which, when executed by a computer, causes the computer to perform a process comprising:
a memory information storage procedure causing the computer to carry out a memory information storage process which generates memory information related to a memory region used by a program that is being executed by the computer and stores the memory information;
an interface procedure causing the computer to register a storage location of the memory information generated by the memory information storage procedure;
a notifying procedure causing the computer to receive a notification from a loading part including a plurality of ports and configured to make the notification when a portable storage device is detachably connected to the computer via one of the plurality of ports;
a registering procedure causing the computer to register the portable storage device as the storage location of the memory information using the interface procedure; and
an executing procedure causing the computer to register the storage location of the memory information in the portable storage device by the registering procedure when the notification is received by the notifying procedure.

16. The non-transitory computer-readable storage medium as claimed in claim 15, wherein the registering procedure registers the portable storage device as the storage location of the memory information when the portable storage device prestores key information indicating that the storage device is for use in storing the memory information.

17. The non-transitory computer-readable storage medium as claimed in claim 15, wherein the registering procedure causes the computer to read a registering part installed in the portable storage device.

18. The non-transitory computer-readable storage medium as claimed in claim 15, wherein the registering procedure causes the computer to make a reference to a storage location stored in a setting file which specifies the storage location, as the storage location of the memory information, when the portable storage device stores the setting file.

19. The non-transitory computer-readable storage medium as claimed in claim 15, wherein the registering procedure causes the computer to register a plurality of storage locations of the memory information.

20. The non-transitory computer-readable storage medium as claimed in claim 19, wherein the memory information storage procedure causes the computer to check whether the memory information is storable in the plurality of storage locations in an order in reverse to an order with which the plurality of storage locations are registered, and to store the memory information in a storable one of the plurality of storage locations.

* * * * *